United States Patent [19]
Simon et al.

[11] Patent Number: 5,468,055
[45] Date of Patent: Nov. 21, 1995

[54] DEVICE FOR ATTENUATING THE ROLLING NOISE OF VEHICLES

[75] Inventors: Jean-Michel Simon, Clamart; Didier Barat, Chateu-Landon, both of France

[73] Assignee: Hutchinson, France

[21] Appl. No.: 242,096

[22] Filed: May 13, 1994

[30] Foreign Application Priority Data

May 14, 1993 [FR] France .................. 93 05862

[51] Int. Cl.$^6$ .................. F16F 15/00
[52] U.S. Cl. .................. 301/6.91; 295/7; 188/267; 188/380
[58] Field of Search .................. 301/6.1, 6.2, 6.91, 301/5.21, 5.22; 295/7, 6; 188/378, 379, 380, 267; 267/140.14, 140.15; 181/208, 209; 74/443, 573 R, 574

[56] References Cited

U.S. PATENT DOCUMENTS

| | | |
|---|---|---|
| 1,655,807 | 1/1928 | Baker .................. 301/6.91 |
| 2,034,816 | 3/1936 | Huguenin .................. 295/7 X |
| 4,392,681 | 7/1983 | Raquet .................. 295/7 |
| 4,635,990 | 1/9187 | Golubenko et al. .................. 295/7 X |
| 4,724,923 | 2/1988 | Waterman .................. 188/380 X |
| 4,869,474 | 9/1989 | Best et al. .................. 188/379 X |
| 4,935,651 | 6/1990 | Hong et al. . |
| 4,991,698 | 2/1991 | Hanson .................. 301/6.91 X |
| 5,052,529 | 10/1991 | Sutcliff et al. .................. 188/380 X |

FOREIGN PATENT DOCUMENTS

| | | |
|---|---|---|
| 0275791 | 7/1988 | European Pat. Off. . |
| 0344923 | 12/1989 | European Pat. Off. . |
| 1295476 | 4/1961 | France . |
| 325363 | 5/1917 | Germany . |
| 4004333 | 9/1990 | Germany . |
| 4138405 | 2/1993 | Germany . |
| 63901 | 3/1990 | Japan .................. 295/7 |
| 868182 | 9/1981 | U.S.S.R. .................. 188/378 |
| 1449360 | 1/1989 | U.S.S.R. .................. 295/7 |
| 531122 | 7/1938 | United Kingdom . |

Primary Examiner—Russell D. Stormer
Attorney, Agent, or Firm—Larson and Taylor

[57] ABSTRACT

Device for attenuating the rolling noise of vehicles, mounted on a component (3) connected to the wheel. The device includes an annular mass (5) coaxial with the wheel shaft (2) and several actuators of the automatically-controlled linear motor type (6 to 8), acting radially between the mass (5) and the component (3). The motors (6 to 8) are variable-reluctance motors. The device also includes elastic members (9) around the shaft (2) and capable of withstanding the static loads exerted between the inertial mass or masses (5) and the said component (3). The actuators and their powering alternators may be housed in the wheel rims.

7 Claims, 6 Drawing Sheets

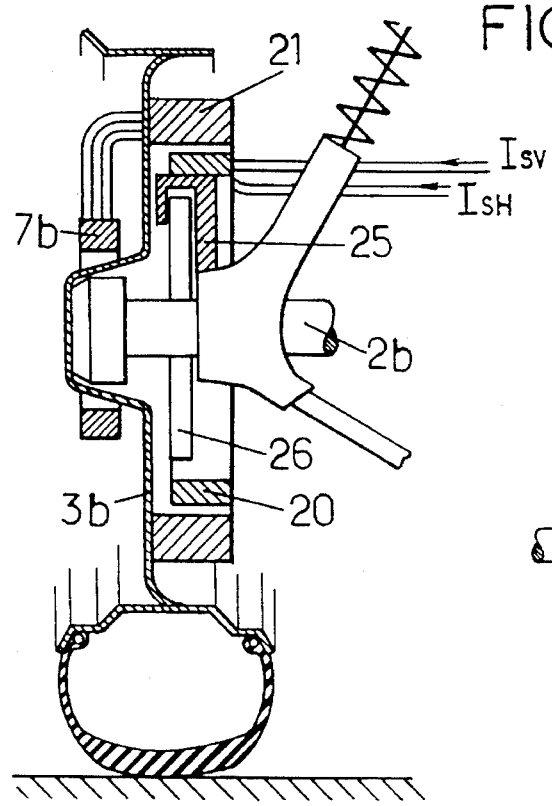
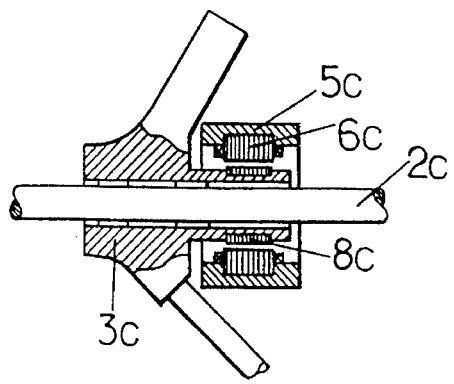
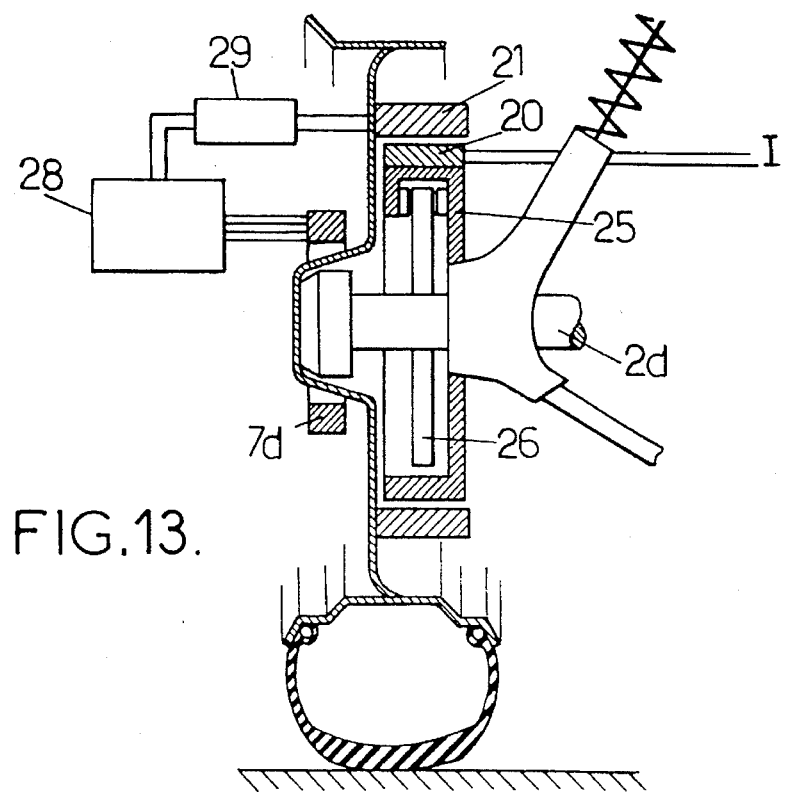

5,468,055

DEVICE FOR ATTENUATING THE ROLLING NOISE OF VEHICLES

FIELD OF THE INVENTION

The present invention relates to a device for attenuating the rolling noise of vehicles, mounted on a component which rotates or is fixed securely to the wheel, such as wheel stub axle support (fixed in terms of rotation) or wheel rim (rotating).

BACKGROUND OF THE INVENTION

The rolling noise of vehicles is currently filtered out by virtue of passive means.

On surfaces particularly likely to generate rolling noise, the effectiveness of such means is insufficient.

SUMMARY OF THE INVENTION

In order to obtain better results, the invention aims to implement active means, that is to say actuators, and this being in such a way that they act as close as possible to the very source of the rolling noise, in order to avoid having to multiply these actuators.

To this end, a device in accordance with the invention is characterized in that it includes, for each wheel, one or more inertial masses distributed about the shaft of the wheel, these masses being connected by controlled actuators to a component which is joined to the wheel so as to receive the vibrations therefrom, a component such as a stub axle support of the shaft or a rim of the wheel.

The action is therefore as direct as it could possibly be on this component, by action/reaction between the latter and the inertial mass or masses, which makes it possible to filter the vibrations out effectively in the desired frequency band. The inertial mass or masses therefore act both as inertia masses and as supports for the set of linear motors.

The loads transmitted to the component may be exerted along one or two axes depending on the number of linear motors used. It is possible, for example, to use an even number of motors, opposite one another in pairs, or arranged with any other layout exhibiting symmetry or otherwise with respect to the axis of the wheel shaft.

According to a complementary arrangement of the invention, elastic members capable of withstanding the static loads exerted between the inertial mass or masses and the component are provided.

The elastic members could be arranged, for example, in each space between two neighboring linear motors. In particular, elastomer blocks, adhesively bonded between the inertial mass or masses and the rotating component could be used. This would thus avoid the actuators having to generate static loads; moreover, the dimensions of the actuators could be decreased by choosing, for the blocks, a stiffness which reduces the loads to be provided, for the predominant frequency band of the wheel vibrations.

Advantageously, these actuators, namely the aforementioned linear motors, will be automatically-controlled variable-reluctance motors, of the type of those which are described in document FR-A-91 14576 in the name of HUTCHINSON.

These motors may advantageously be mounted in a rotating part, namely in a wheel rim. In this mode of application, it will be seen later that the invention also envisages original means for powering the actuators, avoiding calling upon conventional systems of rings or of brushes, which would pose problems of protection against dust, water, oil, grease, etc.).

BRIEF DESCRIPTION OF THE DRAWINGS

Various embodiments of the invention are described hereinbelow by way of non-limiting examples, with reference to the figures of the drawing appended hereto, in which:

FIG. 12 shows, in a view similar to that of FIG. 4, the layout of the wheel alternator, as well as the connection between the rotor and the actuators;

FIG. 12a represents partially a variant of the embodiment of FIG. 12; and

FIG. 13 represents, in a view similar to that of FIG. 12, a variant according to which an electronic computer is interposed between the alternator rotor and the actuators, the stator being powered separately.

DETAILED DESCRIPTION OF THE PREFERRED EMBODIMENTS

Figure 1:
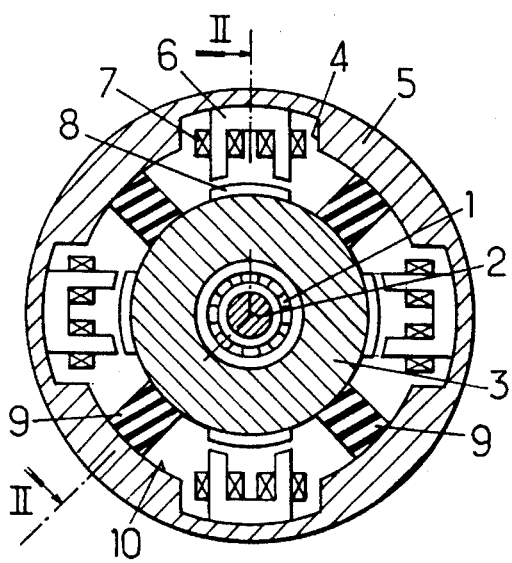
FIG. 1 is a view in transverse section of a vehicle wheel stub axle support equipped with a device in accordance with the invention.
Figure 2:
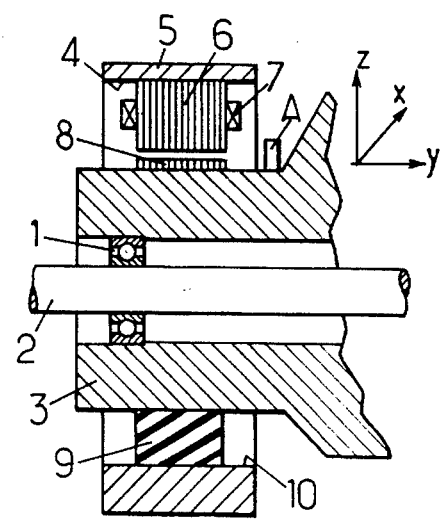
FIG. 2 is a view in section along the line II—II of FIG. 1.

In FIGS. 1 and 2, the reference 1 refers to the rolling-contact bearings interposed between the shaft 2 of the wheel and the stub axle support 3. In the internal housings 4, distributed around the axis of the shaft 2, of an annular mass 5 surrounding the stub axle support, are housed automatically-controlled variable-reluctance linear motors with radial action; their body, fixed to the bottom of the housings 4, is referenced as 6, their coils as 7, and the associated magnetic component, fixed to the stub axle support 3, as 8.

In the spaces thus left between two successive motors there are arranged, for the purpose indicated above, elastomer blocks 9 adhesively bonded on one side to the stub axle support 3, and on the opposite side to the internal surface 10 of the annular mass 5.

Figure 3:
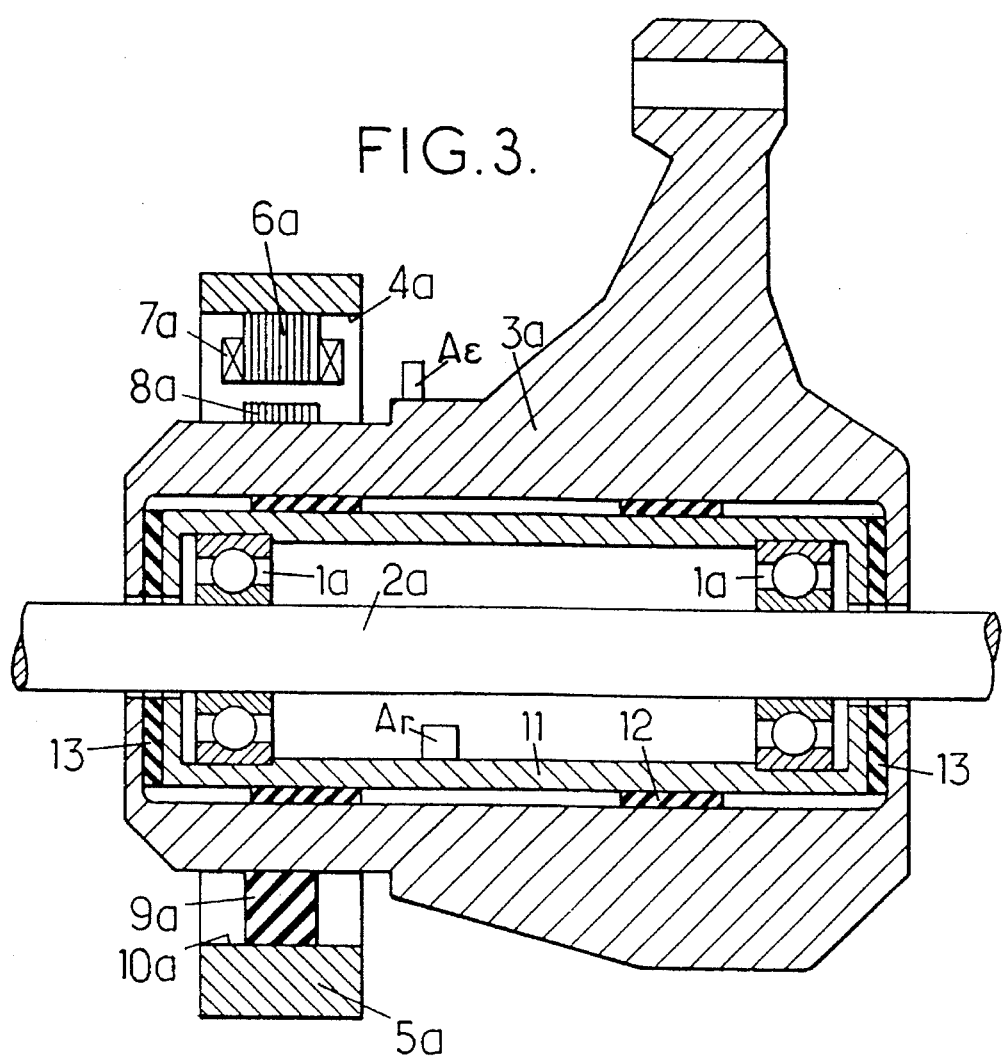
FIG. 3 is a view in axial section of a variant.

In the embodiment of FIG. 3, with an "a" suffix, the same references as hereinabove have been used to denote the same members or similar members. In addition, around the shaft 2a, there has been provided a rigid casing 11 bearing on the rolling-contact bearings 1a and held inside the stub axle support 3a by radially-acting elastomer blocks 12 of low stiffness, and by elastomer blocks 13 acting as axial limit stops with high stiffness.

This solution makes it possible both to obtain an additional filtering stage and not to give rise to deformations of the tire.

Figure 4:
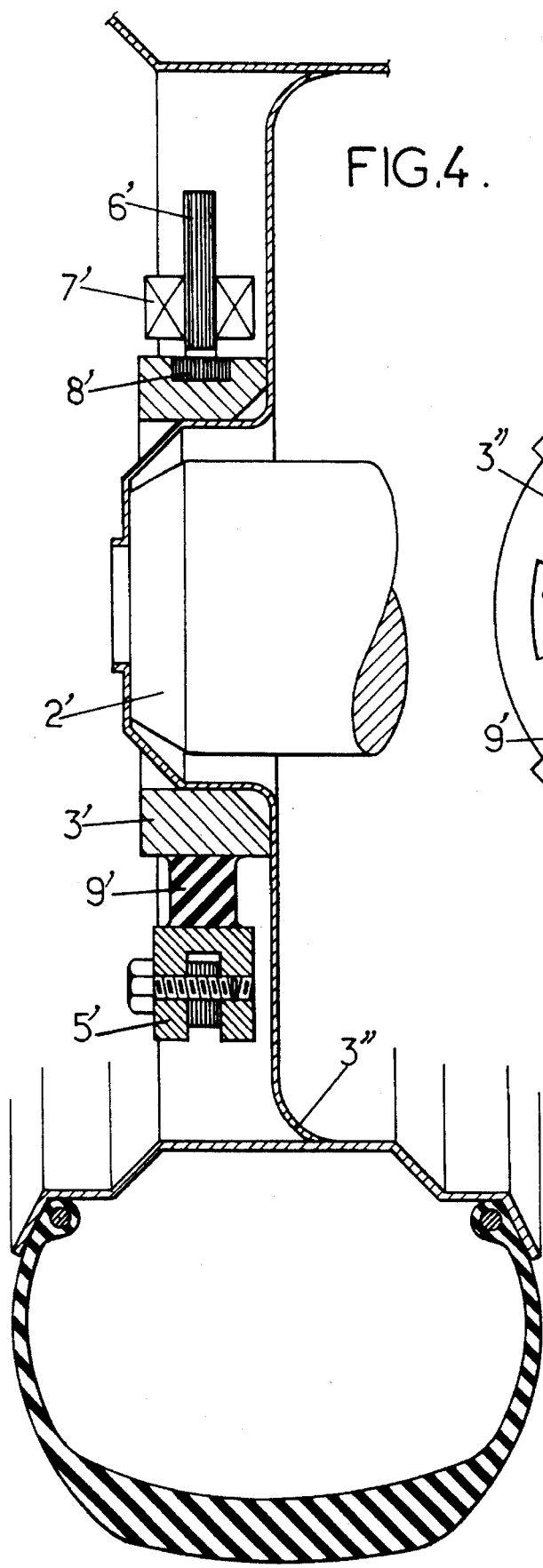
FIG. 4 is a view in axial section, along the line IV—IV of FIG. 5, of a wheel rim equipped in accordance with the invention.
Figure 5:
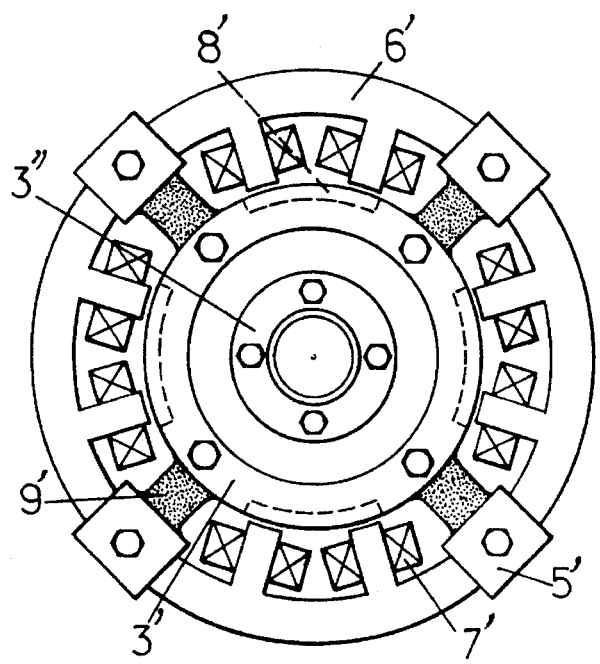
FIG. 5 is a front-on view of the center of the rim.

In the embodiment of FIGS. 4 and 5, the fitting of the device of the invention directly onto a wheel rim has been represented. In these figures, with the "prime" index, the same references have been used as in the preceding figures in order to denote parts which are similar or which fulfil the same role as in the two preceding embodiments.

In these figures, the reference 2' refers to the axle of the wheel, the rim 3" of which bears a fastening annulus 3' fixed by screws, which fulfils the same role as the stub axle support 3 of the other embodiments. This fixing annulus is joined by elastomer blocks 9', taking up the static loads, to an inertial mass, the inertial mass comprises the laminated magnetic body 6' of two automatically-controlled variable-reluctance linear motors equipped with coils 7', as well as clamping components 5' into which the body 6' is bolted. On the outside, the fixing annulus 3' carries magnetic components 8' making it possible to close the magnetic circuits of the two motors. These two motors, automatically-controlled from a system of appropriate sensors, make it possible to create loads for cancelling out the vibrations, by acting between the inertial mass and the rim 3" in two directions perpendicular to the axis of the wheel, one of them vertical, the other horizontal as in the other embodiments.

This third solution proposed by the invention makes it possible not to have to modify the stub axle support of the wheel.

In all the embodiments, the rotating system could receive the necessary electrical power (a few tens of W) by any suitable power-supply system.

For example, use could be made of rotating electrical contacts at the wheel-hub level, or of electromagnetic generation of the necessary current. This could be achieved, for example, by virtue of magnets fixed to the brake callipers and inducing current in coils fixed to the rim. The transmission of the electromagnetic waves could also be assured by a waveguide system carried by the callipers, and receiving antennae fixed to the rim.

In any case, the various embodiments described hereinabove could require various types of powering of the actuators, and various control algorithms.

In the embodiment of FIGS. 1 and 2, the only information produced is the accelerations measured on the stub axle support 3, which leads to the need for automatic-control of the "feedback" type, this being on the basis of an accelerometer A mounted on this stub axle support. This accelerometer provides electrical signals which represent the vertical z and horizontal x accelerations, these accelerations being exerted on the wheels in the direction of forward travel of the vehicle.

Figure 2A:
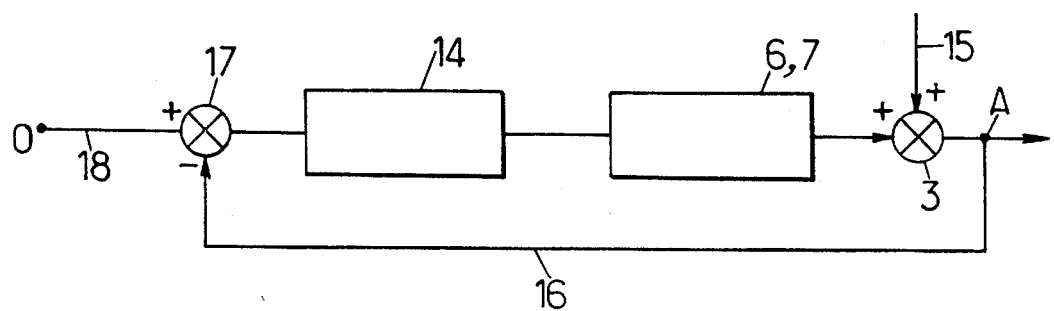
FIG. 2a represents the diagram of the corresponding control algorithm.

The algorithm could then be that of FIG. 2a, in which the rectangle 6–7 represents the horizontal or vertical actuator in question, and the rectangle 14 represents a phase-correcting circuit. The input disturbance (horizontal or vertical vibration of the wheel) is represented by the arrow 15, and is therefore exerted on the stub axle support 3 concurrently with the output from the actuator 6–7. At this level, the accelerometer A provides, via the feedback loop 16, a control signal, representing the residual acceleration on the stub axle support, to an operator 17 receiving a zero reference signal on its other input 18.

The embodiment of FIG. 3 makes it possible to modify this diagram using an accelerometer with a reference signal Ar arranged on the casing 11, and an accelerometer Ae on the stub axle support 3a, the signal of which therefore represents the residual accelerations to which the wheel is subjected in the aforementioned z- and x-directions.

Figure 3A:
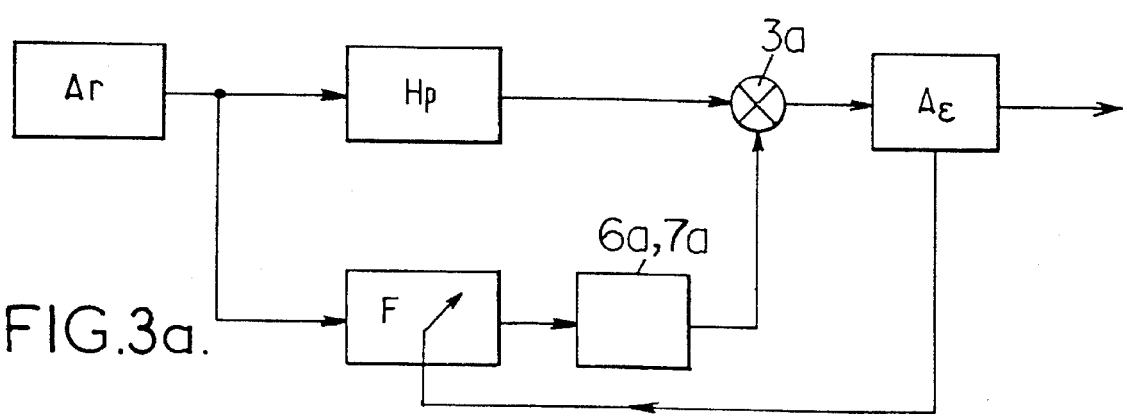
FIG. 3a represents the diagram of the corresponding control algorithm.

FIG. 3a shows the diagram of the algorithm which could then be used, which is of the so-called "feed-forward" type. In this diagram, Hp represents the transfer function (or control ratio) between the reference accelerations picked up on the casing 11 (receiving the vibrations from the wheel), and the residual accelerations picked up on the stub axle support 3a, measured by the accelerometer Ae. The signal of these residual accelerations is used to set a filter F located in the loop of the actuator 6a, 7a, between the output from the reference accelerometer Ar and the stub axle support 3a.

There will now be described specific power-supply systems which can be used with the embodiment of FIGS. 4 and 5, which can be distinguished from the preceding ones by the implementation, in an "active rim", of actuators which are rotationally driven, whereas in the preceding embodiments, they are rotationally fixed.

In accordance with another aspect of the invention, the power necessary for powering the actuators is created directly by using an alternator between the rim and the brake calliper of the wheel, the part fixed to the calliper being the stator, and the part fixed to the rim being the rotor. The stator is powered so as to create magnetic induction in the air gap, and the rotor is wound so as to be able to pick up the current induced when the wheel rotates.

It is therefore possible to benefit from such a solution so that the powering current of the stator makes it possible to bring about the vertical and horizontal loads which are to be created on the rim by means of the actuators. In order to do that, the stator is wound with two independent coils which make it possible to create two distributions of magnetic induction in the air gap of the wheel alternator, the first coil making it possible to create the vertical loads in the z-direction, and the second coil making it possible to create the horizontal loads in the x-direction.

Figure 6:
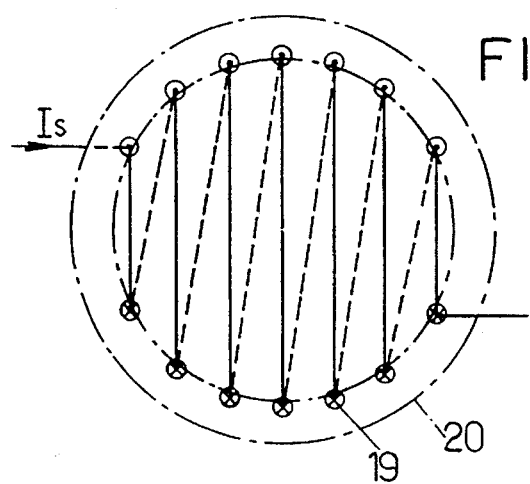
FIG. 6 shows the winding of a wheel alternator stator intended to power the actuators of the mode of application of FIGS. 4 and 5.

In FIG. 12 and diagrammatically in FIGS. 6–9, there is represented with similar elements having a "b" suffix after the same references used before and by way of example, a stator 20 coil 19 making it possible to create the horizontal loads (it being understood that the same principle could be used to generate the vertical loads), this stator 20 being mounted, for example, on a disc-brake 26 calliper 25, as represented in FIG. 12. The arrow $I_S$ of FIG. 6 represents the powering current for the stator; in FIG. 12, $I_{SH}$ denotes the supply current for the stator coil capable of creating the horizontal loads, and $I_{SV}$ the powering current of the stator coil capable of creating the vertical loads.

Figure 7:
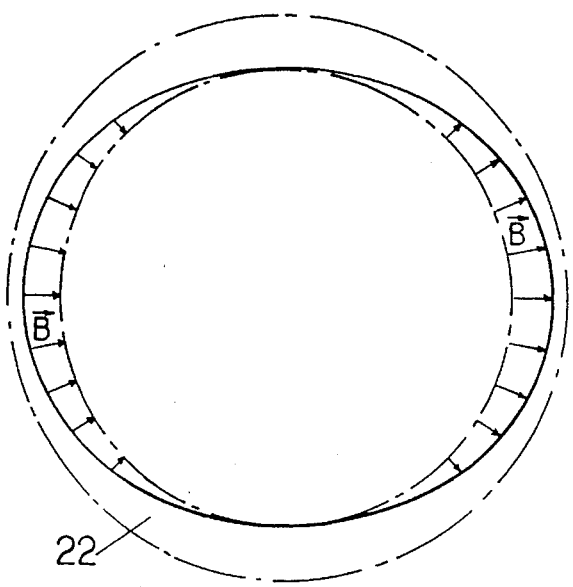
FIG. 7 represents the appearance of the magnetic induction in the air gap between the stator and the rotor of this alternator.
Figure 8:
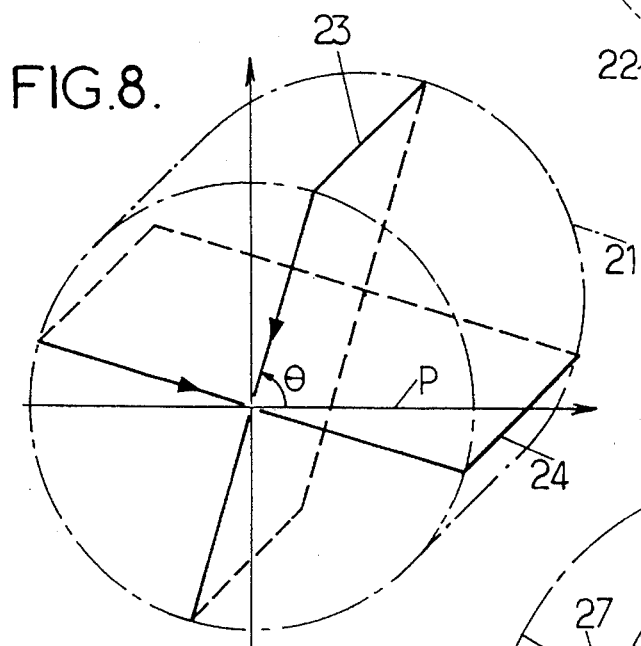
FIG. 8 represents two turns, offset by 90°, of the rotor of the alternator.
Figure 9:
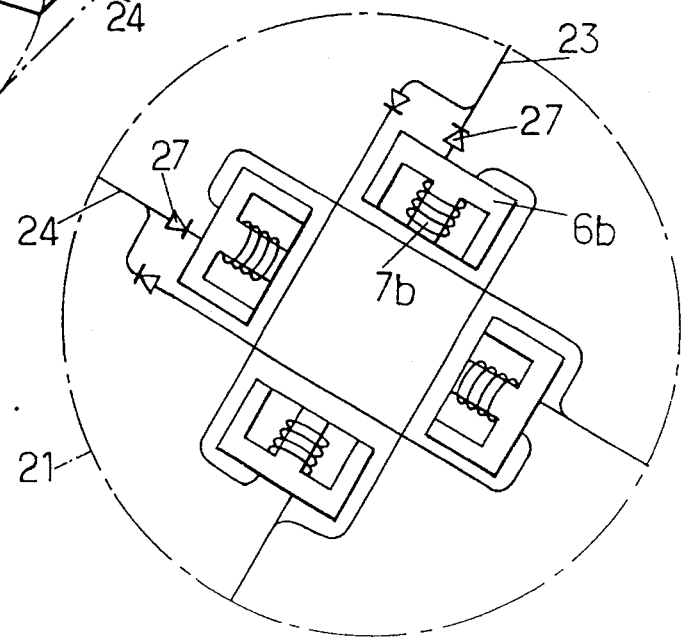
FIG. 9 represents the connections between these turns of the rotor and the coils of the actuators of FIGS. 4 and 5.
Figure 10:
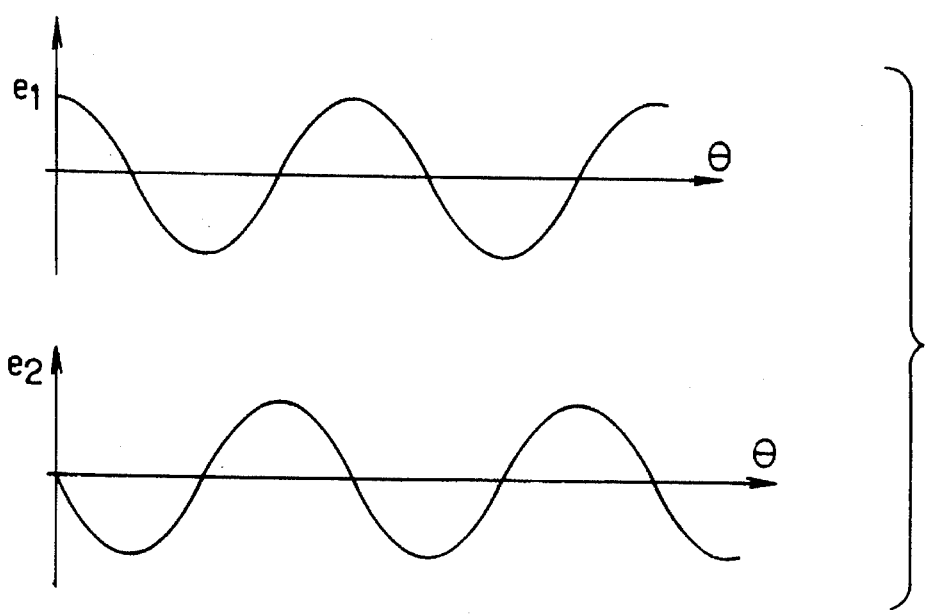
FIG. 10 shows the appearance of the electromotive forces of the two offset turns of the rotor.
Figure 11:
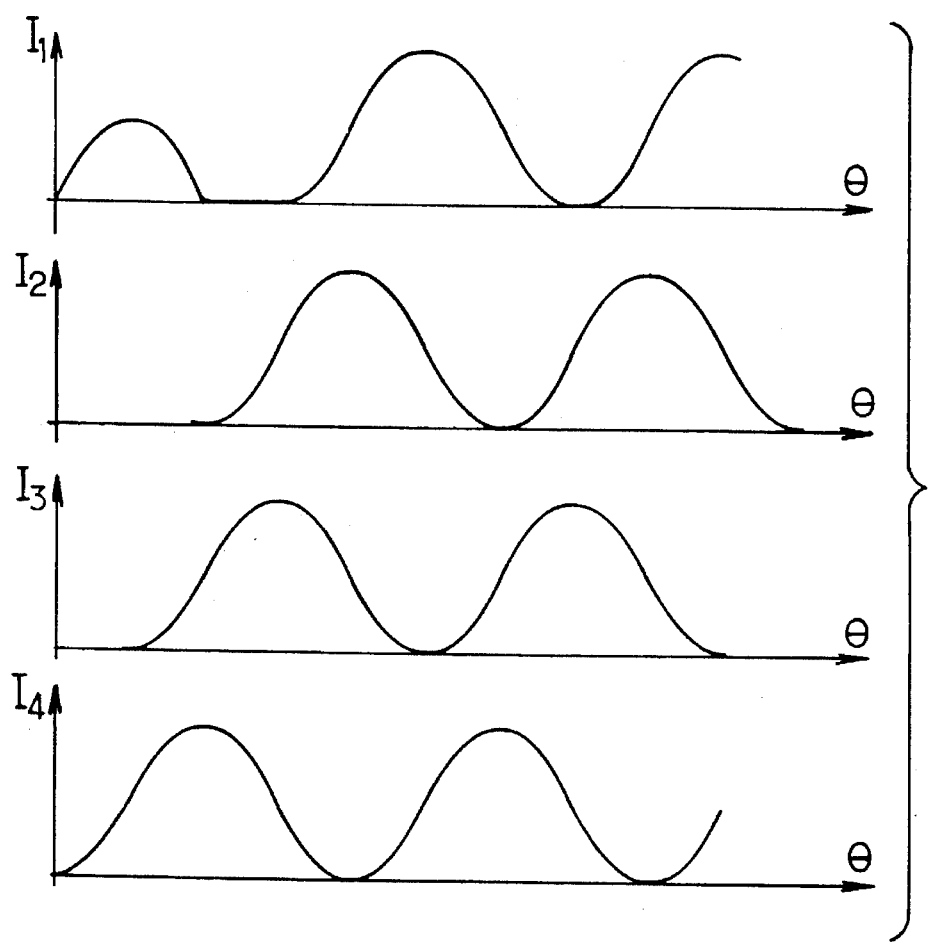
FIG. 11 shows the appearance of the currents in the four actuators of the embodiment of FIGS. 4 and 5.

By suitably distributing the strands of the coil 19 of the stator, in order to create the vertical loads, the theory shows that it is possible to obtain, within the air gap 22 between the stator 20 and the rotor 21 of the alternator, a magnetic induction B having the appearance represented in FIG. 7. It is then possible to use, on the rotor 21, two turns 23 and 24 (FIG. 8) which are offset by 90° and connected to the actuators 6b–7b in the way represented in FIG. 9. By virtue of these connections and the fitting of the rectifiers 27 as indicated, it is possible to obtain, in the two turns 23 and 24, the electromotive forces 21 and 22 offset by 90° indicated in FIG. 10, as well as currents in phase opposition, $I_1$, $I_3$ and $I_2$, $I_4$ in two diametrically opposite actuators, and this being for each of the two pairs of actuators used in the example, as illustrated in FIG. 11 (in FIGS. 10 and 11, θ represents the angle which the plane of one (23) of the turns of the rotor forms with a reference plane (P—see FIG. 8).

By virtue of all of these arrangements and as the theory demonstrates, it is possible to obtain, on the rim 3" of the wheel, horizontal and vertical loads which are proportional to the square of the corresponding powering current $I_S$ of the stator.

FIG. 12a depicts the possibility of establishing the annular mass 5c, as well as the actuators 6c and associated magnetic component 8c towards the inside with respect, to the stub axle support 3c, which clearly occupies the space available, which is much greater at this point.

FIG. 13 represents with similar elements having a "d" suffix after the same references used before a variant according to which the control of the various actuators 6d–7d is determined by a computer 28 mounted directly in the rim and connected to the rotor 21 by a rectifier circuit 29, also mounted in the rim. The stator 20 is again mounted on the calliper 25 of the disc brake 26, and may be powered with DC current.

We claim:

1. A device for attenuating rolling noise or vibrations of a wheel of a vehicle, where the wheel includes a component surrounding a shaft about which the wheel rotates, said attenuating device comprising:

an accelerometer secured to the component which provides signals representing accelerations of the wheel in vertical and horizontal directions;

an inertial mass distributed about the shaft;

a controlled actuator connecting said inertial mass to the component;

an electrical current feeding means for supplying powering current to said actuator in response to signals received from said accelerometer such that said actuator moves said inertial mass to create loads tending to cancel out the noise or vibrations of the wheel.

2. A device as claimed in claim 1 and further including an elastic member which is provided between said inertial mass and the component to oppose static loads exerted between said inertial mass and the component.

3. A device as claimed in claim 2 wherein said component is a stub axle support in which a rigid casing mounted to the shaft is provided; and further including first elastomer blocks having low radial stiffness provided radially between said rigid casing and the stub axle support, and second elastomer blocks with high stiffness provided axially between said rigid casing and the stub axle support.

4. A device as claimed in claim 3 wherein said accelerometer includes a first accelerometer secured to said rigid casing which provides signals representing accelerations in vertical and horizontal directions, and a second accelerometer secured to the stub axle support which provides signals representing residual accelerations in the horizontal and vertical directions; and wherein said current feeding means includes an algorithm of the feed-forward type which utilizes the signals from said first accelerometer and said second accelerometer.

5. A device as claimed in claim 1 wherein the component is a rim of the wheel; wherein said controlled actuator is a linear variable-reluctance motor having a coil and being mounted on the rim; and wherein said current feeding means includes an alternator housed on the rim, said alternator including a stator secured to a disc brake calliper of the vehicle and a rotor having armature turns which are connected to the coil of the variable-reluctance motor.

6. A device as claimed in claim 5 wherein there are two pairs of said controlled actuators arranged diametrically opposite one another in pairs; and wherein said rotor includes two armature turns offset by 90° with respect to one another.

7. A device as claimed in claim 5 wherein said current feeding means includes a rectifier circuit and a computer connected to said rotor.

* * * * *